United States Patent
Kocsis

(10) Patent No.: US 9,237,443 B2
(45) Date of Patent: Jan. 12, 2016

(54) MOBILE TELECOMMUNICATIONS NETWORK ROAMING

(75) Inventor: Tamas Kocsis, Budapest (HU)

(73) Assignee: Vodafone Group PLC, Newbury (GB)

( * ) Notice: Subject to any disclaimer, the term of this patent is extended or adjusted under 35 U.S.C. 154(b) by 983 days.

(21) Appl. No.: 12/587,233

(22) Filed: Oct. 2, 2009

(65) Prior Publication Data

US 2010/0087191 A1    Apr. 8, 2010

(30) Foreign Application Priority Data

Oct. 3, 2008 (GB) .................................. 0818102.6

(51) Int. Cl.
*H04W 4/00* (2009.01)
*H04W 12/06* (2009.01)
*H04L 29/06* (2006.01)
*H04W 24/08* (2009.01)

(52) U.S. Cl.
CPC ............ *H04W 12/06* (2013.01); *H04L 63/0853* (2013.01); *H04L 63/14* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 5,345,595 A * | 9/1994 | Johnson et al. | 455/410 |
| 5,467,381 A * | 11/1995 | Peltonen et al. | 455/432.1 |
| 5,781,855 A * | 7/1998 | Reuhkala et al. | 455/403 |
| 6,445,915 B1 * | 9/2002 | Baiyor et al. | 455/416 |
| 6,694,001 B1 | 2/2004 | Lampell et al. | |
| 6,721,405 B1 | 4/2004 | Nolting et al. | |
| 6,891,938 B1 | 5/2005 | Scott et al. | |
| 8,238,905 B2 * | 8/2012 | Jiang | 455/432.1 |
| 2003/0072425 A1 | 4/2003 | Hurst | |
| 2004/0192297 A1 * | 9/2004 | Erskine et al. | 455/432.1 |
| 2004/0203750 A1 * | 10/2004 | Cowdrey et al. | 455/432.1 |
| 2005/0084090 A1 | 4/2005 | Moisey et al. | |
| 2006/0045251 A1 | 3/2006 | Liu et al. | |
| 2007/0072587 A1 * | 3/2007 | Della-Torre | 455/410 |

FOREIGN PATENT DOCUMENTS

| | | |
|---|---|---|
| EP | 1303121 A1 | 4/2003 |
| WO | WO 03/013173 A1 | 2/2003 |
| WO | WO 2004/036513 A1 | 4/2004 |

* cited by examiner

*Primary Examiner* — Willie J Daniel, Jr.
(74) *Attorney, Agent, or Firm* — Knobbe Martens Olson & Bear LLP

(57) ABSTRACT

A subscriber of a mobile telecommunications system has a home network and is able to roam in a visited network. A Roaming Record is generated when a subscriber uses telecommunication services in the visited network. Call Detail Records (CDRs) are generated when a call is terminated or originated by the home network. The system includes an analyzer for analysing Roaming Records and CDRs to identify mis-routed telephone calls. In the embodiments, mis-routed telephone calls that are diverted from the fixed International carrier line to a SIM box via a voice over IP connection are detected.

19 Claims, 7 Drawing Sheets

MOBILE TELECOMMUNICATIONS NETWORK ROAMING

TECHNICAL FIELD

This application relates to a mobile telecommunications system in which the subscriber has a home network and is able to roam in a visited network and to a method of identifying mis-routed telephone calls in a mobile telecommunications system in which a subscriber has a home network and is able to roam in a visited network.

BACKGROUND

Mobile telecommunications network users have a "home" network. The home network is the network with which the user is generally permanently registered and with which the user has a contract or other mechanism for paying for services. "Roaming" in other mobile telecommunications networks is permitted when those other telecommunications networks have an agreement with the home telecommunications network.

It is a long term problem for telecommunication network operations that traffic originated from various countries and networks to the home network or to domestic networks is deflected from the normal route to a much cheaper, but lower quality route (e.g. Voice over Internet Protocol, VoIP) without the knowledge of the originating or terminating network operator. In such cases, it is quite typical, that the traffic is routed to a PBX for which so called SIM-boxes (mobile equipments with SIM cards) are connected in order to terminate traffic via the SIM-boxes to the terminating network. This kind of call termination causes a lot of problems and financial loss to the operators. The most important problem is the financial loss (difference between the terminating fee and the minute fee of the SIM-box, cost for extra capacity required by SIM-boxes, etc.). The problems also include unsuccessful calls to roamers and unsuccessful calls from CAMEL roamers from abroad resulting in lost revenue and customer dissatisfaction.

Current methods used to detect SIM-boxes are unsatisfactory. These methods include call behaviour analysis, but this has the main problem that it does not prove SIM-box usage. Another known method is to generate a test call originated from abroad by third parties to the tested network, but this results in extra cost for the operator. It should be noted that the latter method relies on the presentation of the calling line identity (CLI) to the terminating test number in order to recognize SIM-boxes. Since SIM-boxes usually hide their MSISDN, the MSISDN of the SIM-boxes can be detected by the third party if the CLIP override (Calling Line Identity Presentation override) feature is activated for the terminating SIM. In countries in which the handling of CLI is regulated (e.g. for data protection reasons CLIP override should be activated only in certain cases defined by the law) the usage of this method may be illegal. Neither call behaviour analysis, nor third party test call generation are able to detect SIM-boxes from blocked unsuccessful calls attempts and are incapable of measuring the number of blocked (unsuccessful) calls caused by SIM-boxes in the international communication path. Moreover, none of these methods can be used by the originating network to measure international call paths from the originating network to other foreign mobile networks.

Accordingly, it would be desirable to provide an improved arrangement to identify mis-routed international calls, such as those diverted to SIM-boxes.

SUMMARY OF THE INVENTION

According to a first aspect of the system described herein, there is provided a mobile telecommunications system in which a subscriber has a home network and is able to roam in a visited network, in which a roaming record is generated when the subscriber makes or receives a call in the visited network and in which call detail records are generated when a call is terminated or originated by the home network, the system including an analyzer that analyzers the roaming records and the call detail records to identify mis-routed international telephone calls.

The roaming record may include a roaming record identifier of a called party ($CALLED\_PARTY_{VO}$ in the first embodiment). The call detail record may be the call detail record of a call terminated by the home network and includes a call detail record identifier of the called party ($CALLED\_PARTY_{HT}$ or $CALLED\_PARTY_{HO}$ in the first embodiment). The analyzer is operable to compare the roaming record identifier to the call detail record identifier to determine if the respective identifiers correspond. These identifiers will typically be publicly known mobile telephone numbers. If the respective identifiers do correspond, the analyzer is then operable to determine whether call time information in the roaming record corresponds to call time information in the call detail record.

The call time information of the roaming record and the called detail record may comprise the start time of the call. The call time information may also comprise the duration of the call.

In the first embodiment, if the roaming record identifier of the called party and the call detail record identifier of the called party correspond and the call time information corresponds, the analyzer is operable to determine whether a call detail record identifier of the calling party ($CALLING\_PARTY_{HT}$ in the first embodiment) corresponds to a roaming record identifier of the calling party ($CALLING\_PARTY_{VO}$ in the first embodiment) to determine whether the international telephone call is mis-routed. In the first embodiment, if the call is correctly routed via the proper fixed International carrier, the call detail record identifier of the calling party and the roaming record identifier of the calling party (which are mobile telephone numbers in the embodiment) will match. However, if the International carrier diverts the call to a SIM box, typically via a voice over IP connection, the SIM box will use a SIM registered with the home or other domestic network to route the call to the called party. This generates a terminating call detail record for the called party where the calling party identifier is the mobile telephone number of the SIM in the SIM box, rather than the mobile telephone number of the actual original calling party. Therefore, if the call is mis-routed, the call detail record identifier of the calling party will not correspond to the roaming record identifier of the calling party.

In the first embodiment the call detail record generated by the call originated by the home network, which includes an identifier of the called party ($CALLED\_PARTY_{HO}$), is also analysed. The analyzer is operable to compare the roaming record identifier of the called party to the (originated) call detail record identifier of the called party to determine if they correspond. The analyzer also determines whether call time information in the roaming record corresponds to call time information in the (originated) call detail record. If the roaming record identifier and the (originating) call detail record identifier correspond and the call time information corresponds, the analyzer is operable to identify (originated) call detail records and roaming records for which the respective called party identifiers correspond and the respective time data correspond in order to identify mis-routed calls. A roaming record identifier and an (originated) call detail record identifier that correspond also have corresponding call time information indicates that the same called party was called twice at the same time from abroad and from the HPLMN network. This is indicative of the use of a SIM box terminating traffic that that was originated from abroad on the visited network the roaming record was generated. The SIM box will call the called party at the same time as the calling party calls the called party from abroad. Therefore, detection of corresponding identifiers with corresponding call time information detects mis-routed calls.

The system may include a determining device for determining the telephone number of a called party and adding this to the roaming record. This is advantageous if the MSISDN of the calling party is missing from the roaming record in which this parameter should be optional. The telephone number may be determined from an appropriate source such as the Home Location Register, billing system or charging data records or from other appropriate source that can be interrogated using the IMSI of the calling party which is present in the roaming record.

In the second embodiment the roaming record identifier of a called party is $IMSI_{VT}$, and the call detail record includes a call detail record identifier of the called party $IMSI_{HR}$. The call detail record identifier of the calling party in the second embodiment is $CALLING\_PARTY_{HR}$ and the roaming record identifier of the calling party is $CALLING\_PARTY_{VT}$.

The system may also include a converter for converting time information in the roaming record into the local time of the home network. This is advantageous when the visited network is in a different time zone. Time information provided by the visited network (and incorporated in the roaming record) will be the local time of the roaming network. In order that the time information of the roaming record can be correctly compared to the time information in the call detail record from the home network, it is advantageous that the time information is converted into the local time of the home network (or at least so that the time zones of the time information correspond).

According to a second aspect of the system described herein, there is provided a mobile telecommunications system in which a subscriber has a home network and is able to roam in a visited network and in which a temporary location dependent technical telephone number is allocated to the subscriber when roaming to facilitate routing of telephone calls, which temporary technical telephone number is not publicly known, the system including an analyzer for analysing telephone call records to identify telephone calls or attempted telephone calls to the temporary technical telephone number for identifying mis-routed calls.

The temporary technical telephone number may be a Mobile Station Roaming Number, MSRN. In the embodiment an MSRN is allocated to a roaming mobile terminal by the visited network to facilitate the routing of a call to that roaming mobile terminal from that terminal's home network to the visited network. In case of roaming the MSRN facilitates international routing of the call from a gateway mobile switching centre (GMSC) of the home network to the MSC/VLR of the visited network with which the called mobile terminal is actually registered.

It should be noted that a call is routed to the called party with the same standard method when the called party is connected to the home network. Briefly, MSRN is used to route the call to the VLR/MSC where the called party is located regardless whether or not the called party is connected to the home network or to any other network. However, the roaming case is important in the third embodiment in that particular sense that by "dialing" the MSRN by the GMSC of the home network results in an international call to the visited network (and with these methods we try to identify calls terminated by SIM boxes that have foreign origin; foreign origin of SIM box calls is important since it is a proof of the illegal call termination).

Conventionally, an MSRN is only ever dialled by a mobile switching centre, and is not dialled by a mobile telecommunications network subscriber. In some networks calls by subscribers to MSRNs are not permitted, and are recorded as unsuccessful call attempt records (either call data records are generated or data for unsuccessful calls are stored by an appropriate traffic analysing tool collecting information related to traffic from various nodes of the home network). In other networks calls may be permitted and are recorded in call data records. In the embodiment these records may be analysed to identify telephone calls or attempted telephone calls to the technical telephone number for identifying mis-routed calls.

For example, if a call is illegitimately diverted from a fixed international communication link between the home network and the visited network to a SIM box device, for example via a Voice over IP connection, the SIM box will dial the MSRN number. In the embodiment the analyzer is able to identify the MSISDN of the SIM of a SIM box that calls or attempts to call an MSRN, so that the MSISDNs of SIMs of the SIM boxes may be identified.

The system described herein is also applicable to systems where the temporary technical telephone number is a CAMEL roaming number. In case of CAMEL roaming when a non-contract (pre-pay) subscriber is roaming and originates a call, a request by the roaming network is made to the home network to issue a temporary CAMEL roaming number for the purposes of routing the call to the home network that controls and charges the originated call by the appropriate pre-paid platform. If the call is diverted from the normal fixed international connection between the visited network and the home network to a SIM box, typically a Voice over IP connection, the SIM box will call or attempt to call the CAMEL roaming number. In the embodiment, as in the situation described above in relation to MSRNs, some networks do not permit subscribers to dial technical numbers including CAMEL roaming numbers from its network; whilst other networks do permit this. The analyzer analyses unsuccessful call attempt records or call data records to identify the telephone number of the SIM in the SIM box that originated the call or attempted telephone call in order to identify the SIM of the SIM box.

The system described herein also provides methods of identifying mis-routed telephone calls in a mobile telecommunications system in which a subscriber has a home network and is able to roam in a visited network as defined in the claims.

BRIEF DESCRIPTION OF THE DRAWINGS

For a better understanding of the system described herein, embodiments will now be described by way of example and with reference to the accompanying drawings in which.

Figure 2:
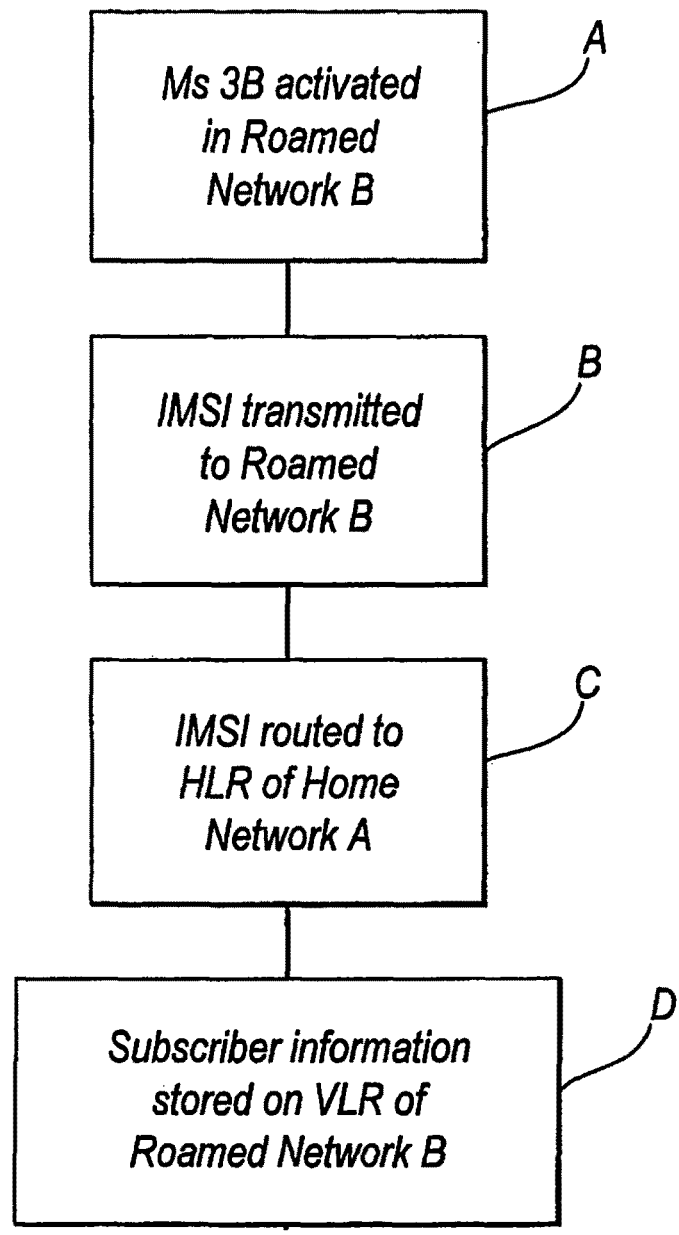
Figure 3:
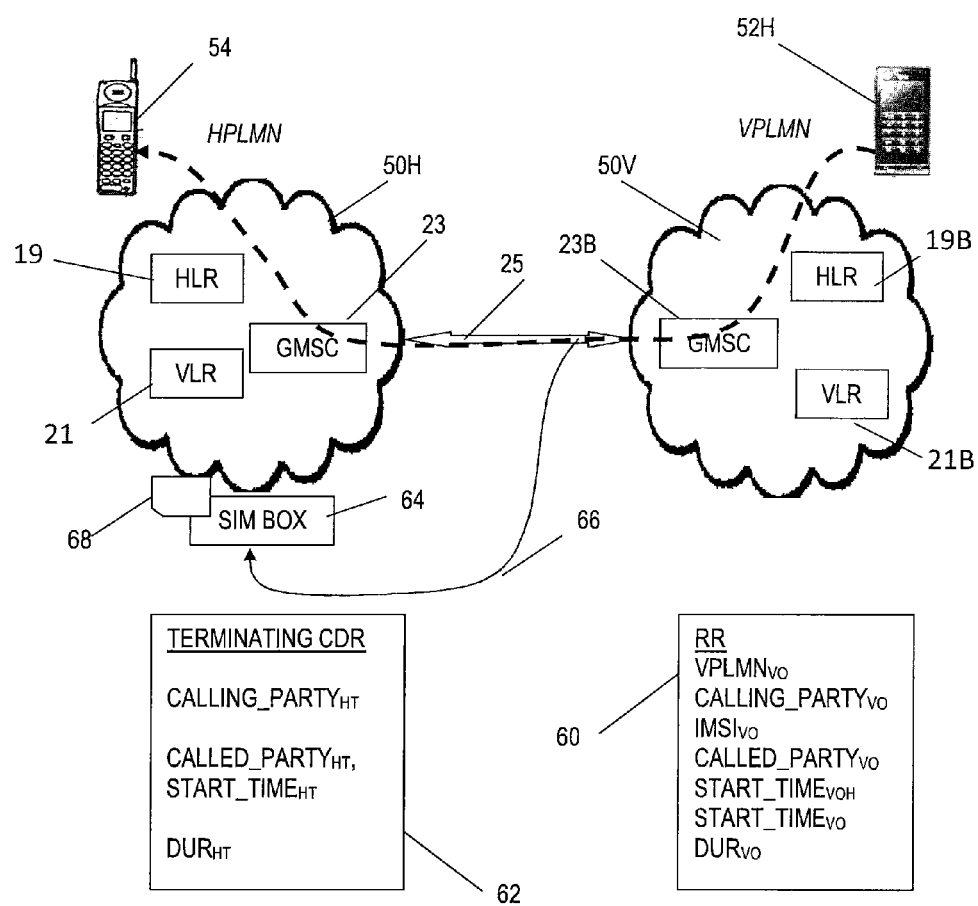
Figure 4:
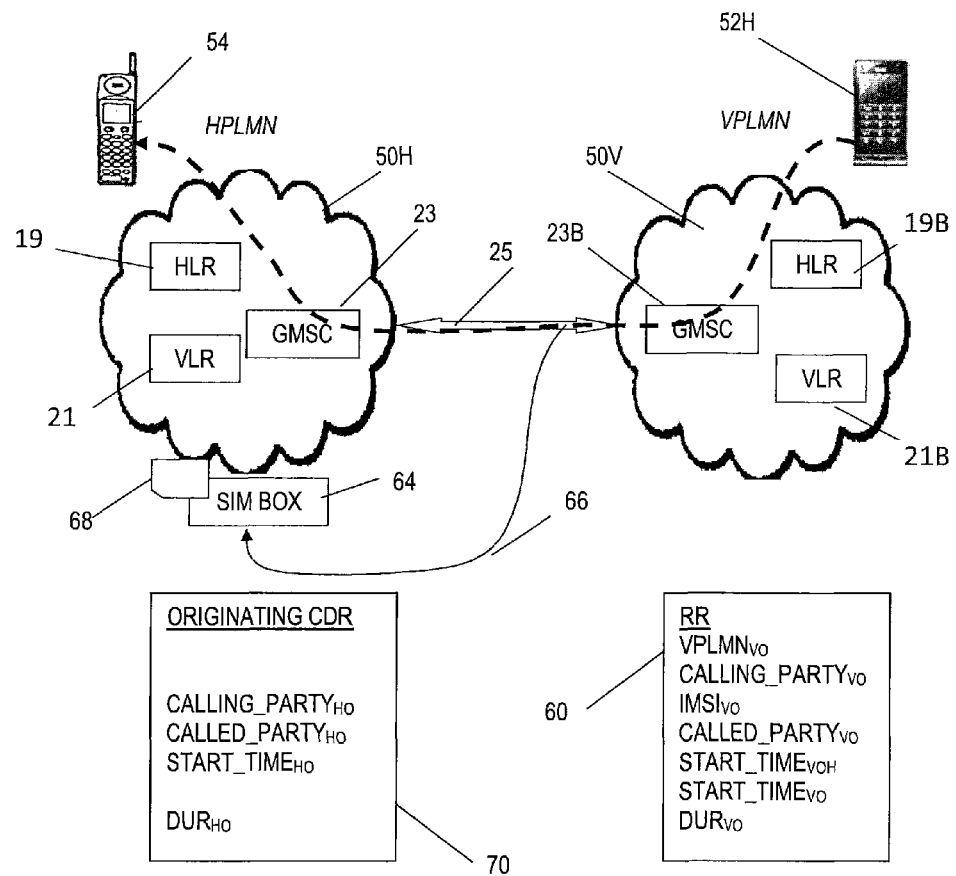
Figure 5:
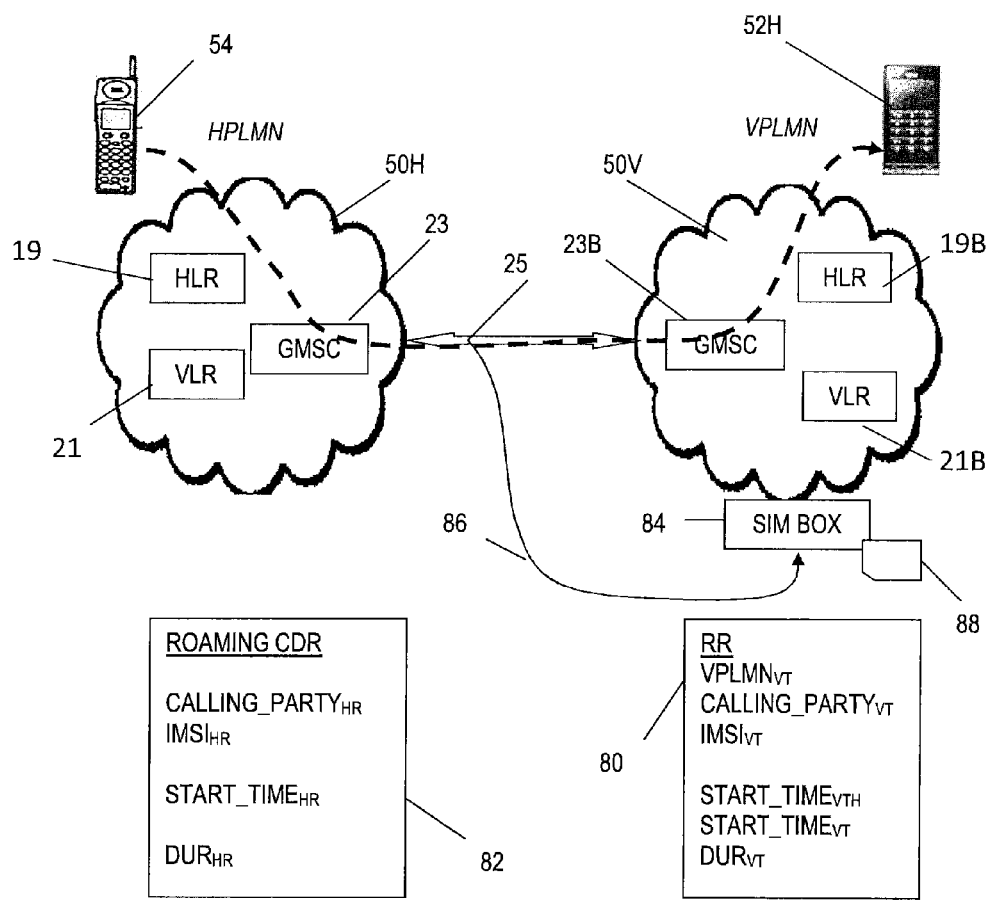
Figure 6:
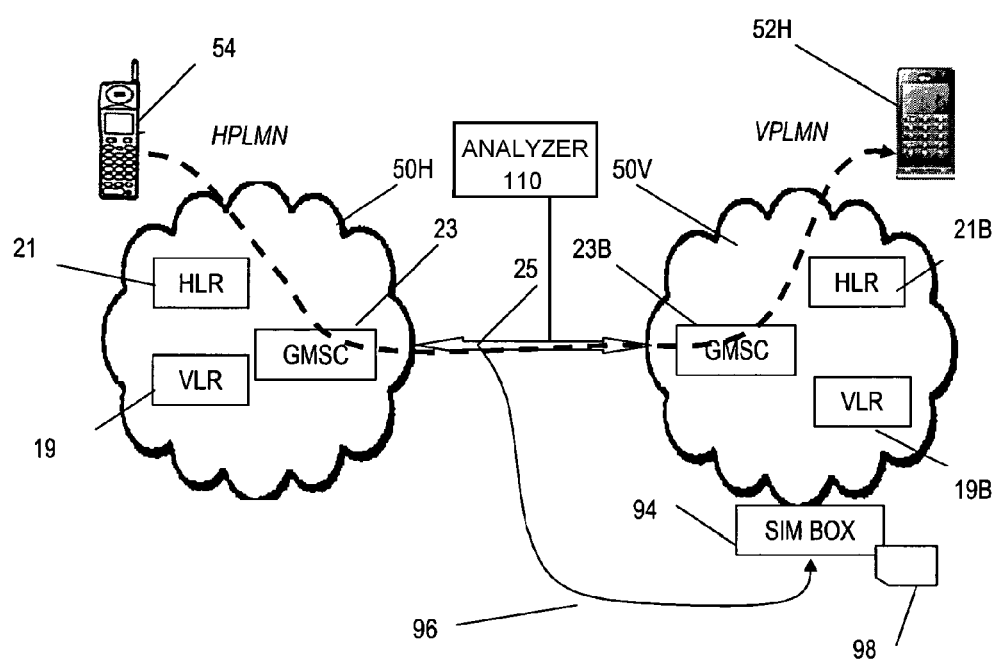
Figure 7:
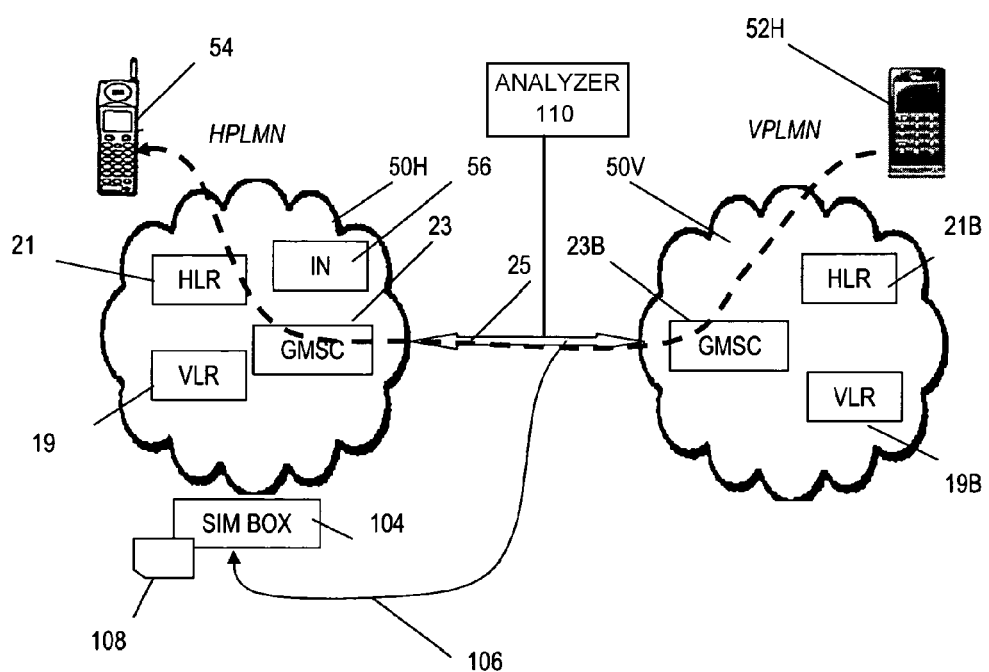

to FIG. 2 is a flow chart showing the steps taken when a roaming mobile terminal is activated in a visited network;

FIG. 3 is a diagrammatic drawing of a home and roamed telecommunications network for use in explaining a first embodiment of the system described herein in which a call is originated from a home network subscriber roaming in a visited network and terminated in the home network and showing the values of a terminating call data record and a roaming record;

FIG. 4 is a diagrammatic drawing similar to FIG. 3 but showing the values in an originating call detail record;

FIG. 5 is a diagrammatic drawing showing a home mobile telecommunications network and a roaming telecommunications network illustrating a second embodiment of the system described herein in which a call is routed by the home telecommunications network and is terminated at a subscriber of the home telecommunications network roaming in the roamed telecommunications network;

FIG. 6 is a diagrammatic drawing of a home telecommunications network and a roaming telecommunications network used to explain a third embodiment of the system described herein in which mis-routed calls are detected that dial an MSRN; and FIG. 7 is a diagrammatic drawing of a home telecommunications network and a roaming telecommunications network used to explain a third embodiment of the system described herein in which mis-routed calls are detected that dial a CAMEL roaming member.

In the drawings like elements are generally designated with the same reference sign and/or are given the same name.

DETAILED DESCRIPTION OF VARIOUS EMBODIMENTS

Figure 1:
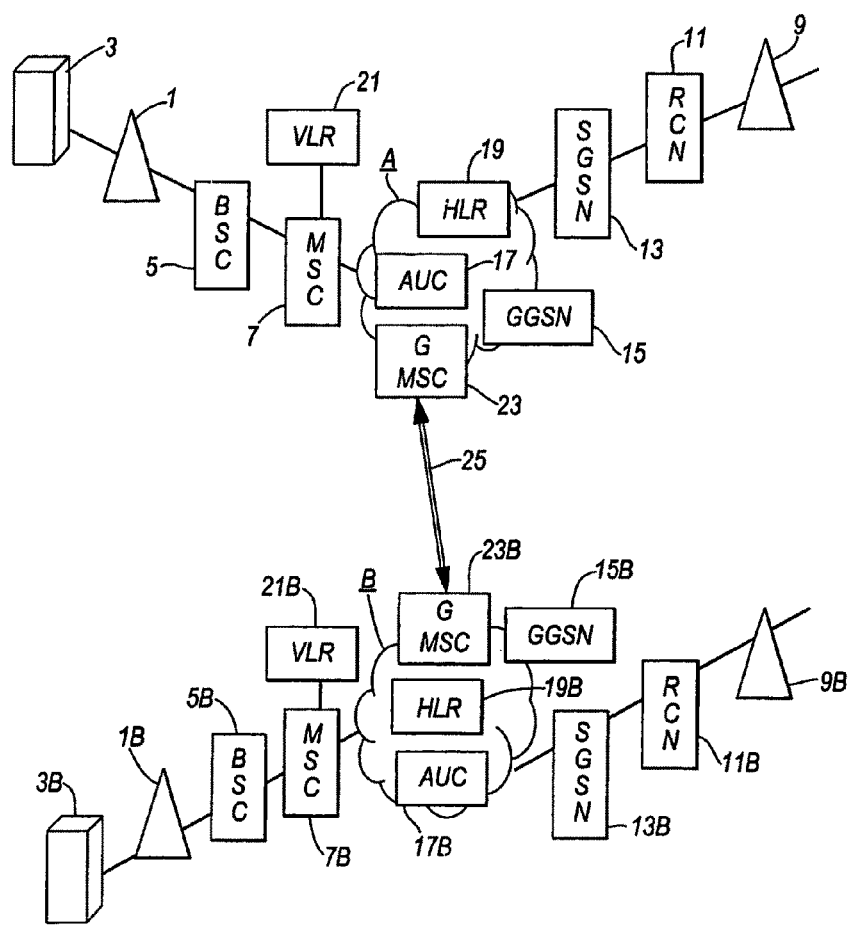
FIG. 1 is a diagrammatic drawing of a home mobile telecommunications network and a roamed telecommunications network.

FIG. 1 diagrammatically explains the apparatus of two GSM/GPRS/UMTS mobile or cellular telecommunications networks between which there is a roaming agreement. The networks comprise "home network" (HPLMN) A and "visited network" (VPLMN) B.

Network A has a number of base transceiver stations (BTSs) 1 (one of which is shown). Each base transceiver station corresponds to a respective cell of the mobile telecommunications network and wirelessly receives communications from and transmits communications to a mobile device ("mobile station", MS) 3 in that cell by radio. The base transceiver station 1 is controlled by a base station controller (BSC) 5. The BSC 5 may control more than one base transceiver station 1. Together, the base transceiver station 1 and the BSC 5 are referred to as a base station (BS). Base stations are arranged in groups and each group of base stations is controlled by a mobile switching centre (MSC), such as MSC 7.

The base transceiver station 1, BSC 5 and MSC 7 are used to route calls in the circuit switched domain. In order to route calls in the packet switched domain, the network A may comprise a plurality of Node Bs 9 (only one of which is shown), each of which is associated with a radio network controller (RNC) 11. The node B 9 and the RNC 11 are controlled by serving GPRS support node (SGSN) 13. In the packet switched domain, the node B 9, RNC 11 and SGSN 13, broadly perform a function corresponding respectively to the base transceiver station 1, BSC 5 and MSC 7 in the circuit switched domain. It should be understood that, although only one of each of the above components is illustrated in FIG. 1, in practice, the mobile telecommunications network will comprise a multiplicity of these elements.

The network A also includes a gateway GPRS support node (GGSN 15) which enables IP-based communications with other networks.

The MS 3 (and each other mobile device that has a subscription with the network A) is provided with a subscriber identity module (SIM/USIM). During the manufacturing process of each SIM, authentication information is stored thereon under control of the mobile telecommunications network A. The mobile telecommunications network A itself stores details of each of the SIMs issued under its control. In operation of the network A, the MS 3 is authenticated (for example, when the user activates the terminal in the network with a view to making or receiving calls) via the network A by sending a challenge to the terminal 3 incorporating a SIM, in response to which the SIM calculates a reply (dependent on the predetermined information held on the SIM—typically an authentication algorithm and a unique key Ki) and transmits it back to the network A. The mobile telecommunications network A includes an authentication processor (AUC) 17 which generates the challenge and receives the reply from the MS 3. Using information pre-stored concerning the content of the relevant SIM, the AUC 17 calculates the expected value of the reply from the SIM/MS 3. If the reply received matches the expected calculated reply, the SIM and the associated MS 3 are considered to be authenticated.

The SIM used by the MS 3 (and any other devices which have a subscription in the network A) may be a SIM or USIM of the type defined in the GSM or UMTS standard specifications, or may be a simulation of a SIM—that is, software or hardware that performs a function corresponding to that of the SIM. The SIM may be in accordance with the arrangements disclosed in WO-A-2004 036513.

In addition to authentication information, the SIM is pre-programmed with a unique identification number, the International Mobile Subscriber Identity (IMSI) which is not visible on the SIM and is not known to the subscriber. The subscriber is of course also issued with a publicly known telephone number, that is the subscriber's telephone number, by means of which calls to that subscriber are initiated by callers. This number is the MSISDN (Mobile Station International ISDN Number).

The network A includes a home location register (HLR) 19 which, for each subscriber to the network A, stores the IMSI and the corresponding MSISDN together with other subscriber data. When a subscriber activates MS 3 in the network A, the MS 3 transmits the IMSI from the SIM to the base transceiver station 1, and from there to the BSC 5 and thence to the MSC 7. The MSC 7 then accesses an appropriate location in the HLR 19 and extracts the corresponding subscriber MSISDN and other subscriber data from the appropriate storage location, and stores it temporarily in a visitor location register (VLR) 21 associated with the MSC 7. In this way, therefore, the particular subscriber is effectively registered with the particular MSC (MSC 7), the subscriber's information being temporarily stored in the VLR (VLR 21) associated with that MSC.

Each of the MSCs of the network A has a respective VLR associated with it and operates in the same way as already described when a subscriber activates their MS in one of the cells corresponding to one of the base stations controlled by that MSC.

When the subscriber wishes to make a call using MS 3, having already registered with the network A using the SIM coupled to the MS 3 in the manner described above, the subscriber enters the telephone number of the called party in the usual way. This information is received by the base transceiver station 1 and subsequently by the base station controller 5, and the call is then routed to the called party via the MSC 7. By means of the information held in the VLR 21, MSC 7 can associate the call with a particular subscriber and thus record information for charging purposes.

Similarly, when a calling party (whether a subscriber within the network or outside it) makes a call for the subscriber holding MS 3, the MSC 7 is able to route this call to the MS 3 via the BSC 5 and base transceiver station 1, using the information relating to that subscriber and to MS 3 which is temporarily stored in VLR 21.

The foregoing is merely a simplified description of the operation of a subscriber's MS 3 when in the subscriber's home network. The home network is the network with which the subscriber is generally permanently registered, although the home network may be changed periodically, for example as disclosed in WO-A-03 013173 ("Extended Roaming"). However, typically the subscriber's SIM will be permanently or semi-permanently registered with the home network. The subscriber will have a contract with the home network (possibly via an intermediary) for the supply of telecommunication services. The home network includes details of the subscriber's subscription status and includes facilities for determining whether the status is such that mobile telecommunications services should be offered to the subscriber. For example, if payment of the subscriber's account is overdue, telecommunications services may be suspended.

In addition to the home network A, FIG. 1 shows a visited network B. Items in visited network B corresponding to those in home network A are similarly referenced but with the suffix "B". Of course, the network B is likely to have a different arrangement and number of MSCs, etc. but generally operates in the same way as network A.

As explained above, for a subscriber of home network A, the respective IMSI and MSISDN and other relevant data particular to that subscriber are stored in the HLR 19. If that subscriber now roams to visited network B and activates a mobile terminal such as MS 3B in that network using their SIM, the procedure described above is substantially repeated.

Thus, the subscriber inserts their SIM card (which has network A as its home network) into the card reader of MS 3B and activates the MS 3B (step A of FIG. 2), the MS 3B transmits the IMSI from the card to the local base transceiver station 1B, BSC 5B and from there to MSC 7B (step B). However, MSC 7B will now recognise, from the structure of the IMSI, that the subscriber is not a subscriber to network B but is a subscriber to network A. (For example, the MSC 7B will detect that the Mobile Network Code (MNC) which forms part of the IMSI does not correspond to the MNC of the network B.) This causes the MSC 7B to access the HLR 19 of network A instead of HLR 19B of network B (step C). The IMSI is sent to the HLR 19 of network A. This accessing by MSC 7B is performed via the gateway MSC (GMSC) 23B of the network B. GMSC 23B of network B is connected to corresponding GMSC 23 of network A by a fixed communication link 25. Such fixed communication link 25 may comprise a fixed telephone line—for example, using the PSTN.

It should be appreciated that such a fixed communication link 25 will typically not be owned by either the home network A or the visited network B (the network operator is typically providing mobile or wireless telecommunication services rather than fixed or cable telecommunications services). The fixed communication link 25 provides a high-quality connection and may typically be provided by an independent third party International Carrier who will require a payment (e.g. a "transmit fee") for its use. Typically, the roamed telecommunications network B will be located in a different country to the home telecommunications network A. The international call termination fee is usually paid by the network from which the call originates, so Network A would pay the International Carrier which owns the communication link 25 if a call is initiated by that network. The International Carrier usually pays the receiving network a "termination fee" to terminate a call in that network, so the International Carrier that owns communication link 25 would pay Network B to terminate a call from Network A in Network B.

When the interconnection between the MSC 7B and the HLR 19 is established (via the fixed communications link 25), the subscriber's information, including the relevant MSISDN and other subscriber data, will be accessed and temporarily stored in the VLR 21B associated with the MSC 7B (step D) and the address of the VLR 21B is also stored in HLR 19.

Conventionally, when a calling party wishes to make a call to the MS 3B, the call would initially be routed to the home network (network A) of the called party (because this network would be the network identified with the subscriber's publicly known telephone number (MSISDN) which the calling party would use). The call arrives at the GMSC 23 of the network A. The (G)MSC wants to route the call to the called party (however the (G)MSC does not know where to route the call). The (G)MSC sends the MSISDN over a signaling link to the corresponding HLR 19. The HLR 19 of network A is then interrogated and would thus produce information that a copy of the subscriber's data was temporarily stored in VLR 21B of network B, thus indicating, of course, that the subscriber had roamed to network B. Via the fixed communication link 25, the HLR 19 of network A interrogates network B to request a Mobile Station Roaming Number (MSRN) for the IMSI from a technical number range (called MSRN range) associated with the VLR 21B. This is in effect a temporary telephone number for the subscriber, being a number appropriate to network B. The HLR 19 "knows" the VLR 21B address from the registration process and the HLR sends the IMSI over the signalling link (to which the called MSISDN is allocated) to the VLR 21B. The VLR 21B allocates the MSRN number (matching to the numbering plan to the network B) from the MSRN range allocated to the given VLR 21B, and the VLR 21B sends back the MSRN over the signalling link to the HLR 19.

To route the call from the calling party, the HLR 19 forwards the MSRN received from the VLR 21B to the GMSC 23 over the signalling link. The GMSC 23 "dials" the MSRN to route the call to the visited MSC 7B. The visited network B recognizes that the number used to route the call fits to a specific MSRN number range of a given VLR 21B and routes the call to the VLR 21B. The VLR 21B searches for the IMSI to which the MSRN number is temporarily allocated and pages the called party 3B using the IMSI (by means of a temporary IMSI, TIMSI) and connects the call.

The calling party is of course not be aware of this MSRN or of the transferring process. The MSRN is not publicly known.

Any charging information associated with any such calls can then be associated with the subscriber information in VLR 21B of network B and eventually transmitted back to network A and billed to network A by network B and also billed to the subscriber by network A in accordance with the contract that the subscriber has with network A.

The only case when an MSRN number is used is to route a call to a given VLR where a called mobile subscriber is located. Further, since the MSRN is only temporarily allocated to the IMSI of the called subscriber, there is no reason for normal subscribers to dial any MSRN numbers. In normal circumstances the MSRN number is "dialled" by a GMSC 23 of the HPLMN (Home Public Land Mobile Network) when the called party 3B is the subscriber of the HPLMN.

"CAMEL" roaming is a special form of roaming for users of an HPLMN that do not have a subscription with the HPLMN but which pre-pay the HPLMN for services. In the case of CAMEL roaming, calls originated by the CAMEL roamers roamed to a VPLMN must be routed to the HPLMN network, in order to charge and control CAMEL roaming calls. When a CAMEL roamer initiates a call the VPLMN recognizes that the calling party is a CAMEL roamer and sends a request to the HPLMN to retrieve a CAMEL roaming number that is allocated temporarily for the calling and called party by the HPLMN. The VPLMN network diverts the call to the CAMEL roaming number received resulting in that the call is routed through international call routes to the HPLMN network. The HPLMN network recognizes that the call is diverted to the CAMEL roaming number range, so connects the call to the Intelligent Network (IN) platform that is used to control and charge CAMEL calls and the IN connects the calling and called parties.

The charging arrangements will now be described in more detail.

Usage generated by an outbound roamer (i.e. a roamer initiating or receiving a call when in a visited network) is charged by the VPLMN to the HPLMN. Charging is based on Transferred Account Procedure (TAP) files sent by the VPLMN to the HPLMN containing details of usage generated by subscribers of the HPLMN on the VPLMN network. In order to minimise roaming fraud VPLMN also should send Near Real Time Roaming Data Exchange (NRTRDE) files to the HPLMN. Since only the content of these incoming files and not of their format is important in connection to the embodiments to be described, records of TAP and NRTRDE files will be referred as incoming Roaming Records (RR) hereinafter.

The following parameters are included in the incoming Roaming Records generated by the VPLMN 50V for calls originated by the subscriber of the HPLMN 50H roamed to the visited network: the identifier of the VPLMN ($VPLMN_{VO}$), the IMSI of the roamed calling party ($IMSI_{VO}$) for which the RR is generated, the number of the called party ($CALLED\_PARTY_{VO}$), the call start time in the local time of the VPLMN ($START\_TIME_{VO}$), and the duration of the call ($DUR_{VO}$).

The RR will therefore include the following for calls originated by the subscriber roamed to the visited network:

$VPLMN_{VO}$,
$IMSI_{VO}$,
$CALLED\_PARTY_{VO}$,
$START\_TIME_{VO}$,
$DUR_{VO}$

The following parameters are included in the incoming Roaming Records generated by the VPLMN 50V for calls terminated by the subscriber of the HPLMN 50H roamed to the visited network: the identifier of the VPLMN ($VPLMN_{VT}$), the IMSI of the roamed called party ($IMSI_{VT}$) for which the RR is generated, the number of the calling party ($CALLING\ PARTY_{VT}$), the call start time in the local time of the VPLMN ($START\_TIME_{VT}$), and the duration of the call ($DUR_{VT}$).

The RR will therefore include the following for calls terminated by the subscriber roamed to the visited network:

$VPLMN_{VT}$,
$IMSI_{VT}$,
$CALLING\ PARTY_{VT}$,
$START\_TIME_{VT}$,
$DUR_{VT}$

When the call is connected to a subscriber mobile terminal of the HPLMN, a terminating type of Call Details Record (CDR) is generated on the HPLMN network as follows:

If the called party is a mobile subscriber of the HPLMN and the call is
    answered by the called party a mobile terminated call record should be generated by the HPLMN,
    forwarded by the called party a call forward record should be generated by the HPLMN,
    answered/forwarded by the subscriber roamed to a foreign network, a roaming record should be generated by the HPLMN.

If the called party is a PBX subscriber of the HPLMN and the call is answered/forwarded by the subscriber a PBX terminated record should be generated by the HPLMN.

If the called party is a service number of the HPLMN a given type of terminating record should be generated by the HPLMN.

The following parameters are included in the terminating type CDR generated by the HPLMN 50H: the MSISDN of the called party ($CALLED\_PARTY_{HT}$) for which the terminating type CDR is generated, the number of the calling party ($CALLING\_PARTY_{HT}$), the call start time in the local time of the HPLMN ($START\_TIME_{HT}$) and the duration of the call ($DUR_{HT}$).

The terminating type CDR will therefore include the following:

$CALLED\_PARTY_{HT}$
$CALLING\_PARTY_{HT}$
$START\_TIME_{HT}$
$DUR_{HT}$

When the call from a subscriber of the HPLMN is initiated in the HPLMN, an originating type of call data record (CDR) is generated on the HPLMN network.

The following parameters are included in the originating type of CDR generated by the HPLMN 50H: the MSISDN of the called party ($CALLED\_PARTY_{HO}$), the number of the calling party ($CALLING\ PARTY_{HO}$) for which the originating type of CDR is generated, the call start time in the local time of the HPLMN ($START\_TIME_{HO}$) and the duration of the call ($DUR_{HO}$).

The originating type CDR will therefore include the following:

$CALLING\ PARTY_{HO}$
$CALLED\_PARTY_{HO}$
$START\_TIME_{HO}$
$DUR_{HO}$

The RR and CDRs are used to make appropriate charges to the called and calling party in a known manner. In a complete departure from the prior art, the embodiment to be described uses this information to detect the use of a "SIM BOX".

First Embodiment

As shown in FIG. 3, in accordance with the first embodiment, matching of originated call record from the incoming Roaming Record (RR) 60 generated by the VPLMN 50V to the terminating type CDR 62 generated by the HPLMN 50H is performed as described below.

Process I

For the incoming roaming records (RRs) of the known type described above, the following steps are applied:

Originated RRs destined to the country of the HPLMN 50H are selected, e.g. by matching the country code of the called party 54.

From this selection the following should be excluded
  CAMEL roaming related records (since in the case of CAMEL roaming the call establishment and call routing to the called party differs to the normal call routing, the CAMEL roaming case is excluded).
  In order to reduce the number of false alarms, records for calls originated to frequently called numbers of the destined country including HPLMN 50H, and to short numbers.

Since the MSISDN in the incoming Roaming Records is either optional or missing by default, the CALLING_PARTY$_{VO}$ of the calling party should be determined from an appropriate source (e.g. HLR, billing system, charging data records or an other appropriate database) based on the IMSI of the calling party (IMSI$_{VO}$).

Since the time stamps for the call start times contained by incoming Roaming Records are in the local time of the VPLMN 50V these time stamps should be converted to the local time (e.g. by using the UTC offset contained by the incoming Roaming Records) of the HPLMN 50H to produce the value call start time in the local time of the HPLMN (START_TIME$_{VOH}$).

As a result of this process, the following parameters should be selected from incoming Roaming Records for calls originated by outbound roamer 52H to the HPLMN 50H:

| VPLMN$_{VO}$ | CALLING_PARTY$_{VO}$ | IMSI$_{VO}$ | CALLED_PARTY$_{VO}$ |
|---|---|---|---|
| START_TIME$_{VOH}$ START_TIME$_{VO}$ DUR$_{VO}$ | | | |

Such a Roaming Record is shown at 60 in FIG. 3.

In order to increase the efficiency of the process described below resulting records should be collected separately based on the date part of the START_TIME$_{VOH}$. However, the process should also be performed without this separation.

In accordance with the first embodiment, an attempt is made to match the RR 60 to the corresponding terminating CDR 62 for a particular call. Process II and Process III are performed for all of the incoming Roaming Records selected above.

Process II

In order to select terminating type CDRs generated by the HPLMN 50H matching to records selected by Process I the following steps are applied for all of the terminating type of CDRs generated by the HPLMN 50H within the time window of the START_TIME$_{VOH}$ values. If any of the matching detailed below fails the process should be restarted with a new terminating type of CDR.

Take a terminating CDR 62 and search for the terminating MSISDN (CALLED_PARTY$_{HT}$) in the CALLED_PARTY$_{VO}$ value in the RRs, including RR 60.
  If CALLED_PARTY$_{HT}$ matches the CALLED_PARTY$_{VO}$ of a RR 60, the terminating call start time (START_TIME$_{HT}$) of the CDR 62 is compared to the START_TIME$_{VOH}$ of the RR 60. Since system clocks of the HPLMN 50H and the VPLMN 50V may slightly differ the START_TIME$_{HT}$ and the START_TIME$_{VOH}$ should be considered as matching time stamps if the absolute value of the time difference between these time stamps is less or equal to a predefined time limit: |START_TIME$_{HT}$−START_TIME$_{VOH}$|<Δt$_{start}$.
  In the next step the terminating call duration DUR$_{HT}$ of the CDR 62 is compared to DUR$_{VO}$ of the RR 60. DUR$_{HT}$ and DUR$_{VO}$ should be considered as matching durations if the absolute value of the difference between these duration is less or equal to a predefined time limit: |DUR$_{HT}$−DUR$_{VO}$|<Δt$_{duration}$. Since the difference in system clocks has no effect on the call durations the Δt$_{duration}$ is typically much less than the Δt$_{start}$.
  If the values defined above match (i.e. the CALLED_PARTY$_{HT}$ matches to the CALLED_PARTY$_{VO}$ and |START_TIME$_{HT}$−START_TIME$_{VOH}$|<Δt$_{start}$ and |DUR$_{HT}$−DUR$_{VO}$|<Δt$_{duration}$, the originating leg (originated from the VPLMN 50V) and the terminating leg (terminated at the HPLMN 50H) of the same call is identified. The number of these matching records should be counted for the VPLMN 50V, for statistical purposes.

In case when system clocks of the different networks are not synchronized it can happen that the time difference of the system clocks of the HPLMN 50H and the VPLMNs vary from VPLMN to VPLMN. In order to improve the accuracy of matching it is desirable to minimize Δt$_{start}$. However, if the time difference of the system clocks of the HPLMN 50H and the VPLMN 50V is higher than Δt$_{start}$ this will result in the records from the VPLMN 50V not being matched to the record from the HPLMN. In order to circumvent this problem the following may be applied:

Perform matching as described above but with a high Δt$_{start}$ and high Δt$_{dur}$. The time difference of START_TIME$_{HT}$−START_TIME$_{VOH}$, and DUR$_{HT}$−DUR$_{VO}$ is stored.

For the stored values those for which the duration difference is below a given limit (|DUR$_{HT}$−DUR$_{VO}$|<Δt$_{duration}$) are processed. For matching records for which the duration difference is below this limit the following should be calculated.
  The mean value of the time differences of the matching records (average value of the start time differences) TIME_SHIFT$_{VPLMN}$.
  The standard deviation of the time differences, DEV$_{VPLMN}$.
  The matching criteria of call start times should be modified as follows:
    |START_TIME$_{HT}$−START_TIME$_{VOH}$−TIME_SHIFT$_{VPLMN}$|<Δt$_{start}$(DEV$_{VPLMN}$), where time limit is calculated from DEV$_{VPLMN}$.

With the above described method VPLMN specific time shifts and VPLMN specific time limits are introduced that improve the accuracy and efficiency of the matching of start times, resulting in increased accuracy and efficiency in the whole record matching process. VPLMN dependent time shift and time limit parameters may be calculated on a given sample and used by the matching process, or may be recalculated for every new usage to be processed.

In records matched as described above the CALLING_PARTY$_{HT}$ value in the terminating CDR 62 will be the same as the CALLING_PARTY$_{VO}$ value of the RR 60 if the call is routed between VPLMN 50V and HPLMN 50H via the International Carrier in the proper way.

As shown in FIG. 3, if the International carrier 25 diverts the call to the SIM BOX 64, typically via a VoIP connection 66, the SIM BOX 64 then uses a SIM 68 registered with the HPLMN 50H or with other domestic network operator (i.e. an operator operating in the same territory as the HPLMN 50H)

to call the terminal 54 and to route the call to the terminal 54. This generates a terminating type CDR on HPLMN 50H where the CALLING_PARTY$_{HT}$ value is the MSISDN of the SIM 68 in the SIM BOX 64 that differs to the original calling party identifier (CALLING_PARTY$_{VO}$) from the matching RR 60.

For these matching call records the phone number of the call originator (CALLING_PARTY$_{HT}$) from the terminating CDR 62 is compared to the MSISDN of the number of the original calling party (CALLING_PARTY$_{VO}$) from the RR 60 as follows:

- If the CALLING_PARTY$_{HT}$ matches the CALLING_PARTY$_{VO}$, the call is determined to be routed in the normal way and the correct calling line identity (CLI) has been presented to the HDLMN 50H. The number of these cases should be counted for VPLMN$_{VO}$ for statistical purposes.
- If CALLING_PARTY$_{HT}$ is different to the CALLING_PARTY$_{VO}$ but the CALLING_PARTY$_{HT}$ is not empty it is determined that the call is routed through a SIM-box 64, and CALLING_PARTY$_{HT}$ is identified as the phone number of the SIM-box 64. The number of these cases should be counted for VPLMN$_{VO}$ for statistical purposes.
- If CALLING_PARTY$_{HT}$ is empty it may be determined that a SIM-box is not introduced in the international call path; however, it should be assumed that the call is deflected from the normal route to a poor quality path. The number of these cases should be counted for VPLMN$_{VO}$ for statistical purposes.

Finishing Process II the following results should be achieved:

- List of MSISDNs of the HPLMN 50H (or other PLMN covering the same country) of SIM-boxes identified as being used to terminate international calls to the HPLMN 50H.
- Call details of matching incoming Roaming Records and terminating type CDRs from which MSISDNs of SIM-boxes are determined can be used as a proof of SIM-box usage.
- Statistical data collected for each VPLMN$_{VO}$ on calls originated by subscribers of the HPLMN 50 from the given VPLMN$_{VO}$ to the HPLMN should be as follows:
  number of calls,
  number of calls for which the correct CLI was presented,
  number of calls for which the CLI was empty, and
  number of calls terminated by SIM-boxes.

This statistical data may also be used for trend analysis if the data is cumulated not only for VPLMN$_{VO}$ but for dates also.

For calls in which empty CLI (empty CALLING_PARTY$_{HT}$) is presented to the HPLMN 50H the carrier from which the call was directly received by the HPLMN can be determined, e.g. based on trunk id. Number of calls with empty CLI should be counted for International Carriers terminating calls to the HPLMN 50H for statistical purposes.

Incoming Roaming Records for problematic calls (no CLI presented or the call is terminated by a SIM-box) should be selected and this information—originally contained by the incoming Roaming Records—should be shared with the VPLMN 50V from which network the problematic usage was originated without violating data protection laws since the VPLMN 50V also has the same usage details. From the shared information the VPLMN 50V should determine International Carriers used to carry the calls in question and should use this information as a proof of SIM-box usage and/or quality problems when negotiating with International Carriers.

Process III

As explained above, when a call is terminated at called mobile terminal 54 a terminating type CDR 62 is generated by HPLMN 50H. Additionally, as shown in FIG. 4, when the SIM BOX 64 registered on the HPLMN 50 network originates a call to the called number (that should be a mobile number of the HPLMN or of any domestic mobile or fixed line operator) an originating type CDR 70 is generated by HPLMN 50H. The following parameters are included in the originating type CDR 70: the number of the called party (CALLED_PARTY$_{HO}$), the number of the calling party (CALLING_PARTY$_{HO}$) for which the originating type CDR is generated, the call start time in the local time of the HPLMN (START_TIME$_{HO}$) and the duration of the call (DUR$_{HO}$)

The originating type CDR 70 will therefore include the following:

---
CALLED_PARTY$_{HO}$
CALLING_PARTY$_{HO}$
START_TIME$_{HO}$
DUR$_{HO}$

---

When any international call is terminated to the called party 54 by a SIM-box 64 used on the HPLMN 50H, a matching pair of an incoming Roaming Record 60 selected by Process I and originated type of CDR 64 (mobile or PBX originated call records) generated by the HPLMN 50H exist since the SIM-box 64 called the same number that was called by the outbound roamer 52H at the same time for the same duration.

In order to select originating type CDRs generated by the HPLMN 50H matching to Roaming Records selected by Process I, the following steps are applied for all of the originating type of CDRs generated by the HPLMN 50H within the time window of the START_TIME$_{VOH}$ values. If any of the matching detailed below fails, the process should be restarted with a new originating type of CDR. The process is as follows:

Take an originating type of CDR 70 and search for the called number (CALLED_PARTY$_{HO}$) in the list of CALLED_PARTY$_{VO}$ off an RR 60.

If CALLED_PARTY$_{HO}$ matches the CALLED_PARTY$_{VO}$ the originating call start time (START_TIME$_{HO}$) should be compared to the START_TIME$_{VOH}$. Since system clocks of the HPLMN and the VPLMN should slightly differ the START_TIME$_{HO}$ and the START_TIME$_{VOH}$ should be considered as matching time stamps if the absolute value of the time difference between these time stamps is less or equal to a predefined time limit: |START_TIME$_{HO}$−START_TIME$_{VOH}$|<$\Delta t_{start}$.

In the next step the originating call duration DUR$_{HO}$ should be compared to DUR$_{VO}$. DUR$_{HO}$ and DUR$_{VO}$ should be considered as matching durations if the absolute value of the difference between these duration is less or equal to a predefined time limit: |DUR$_{HO}$−DUR$_{VO}$|<$\Delta t_{duration}$. Since the difference in system clocks has no effect on the call durations the $\Delta t_{duration}$ is typically much less than the $\Delta t_{start}$.

If the values defined above match i.e. (CALLED_PARTY$_{HO}$ matches CALLED_PARTY$_{VO}$ and |START_TIME$_{HO}$−START_TIME$_{VOH}$|<$\Delta t_{start}$ and |DUR$_{HO}$−DUR$_{VO}$|<$\Delta t_{duration}$), the originating leg (originated from the VPLMN 50V) and a matching originating leg (originated from the HPLMN 50V) of the same call is identified and the CALLING_PARTY$_{HO}$ is the MSISDN of the SIM 68 of the SIM-box 64 identified. The number of matching records should be counted for VPLMN$_R$ for statistical purposes.

In case when system clocks of the different networks are not synchronized it can happen that the time difference of the system clocks of the HPLMN 50H and the VPLMNs vary from VPLMN to VPLMN. In order to improve the accuracy of matching it is desirable to minimize $\Delta t_{start}$. However, if the time difference of the system clocks of the HPLMN 50H and the VPLMN 50V is higher than $\Delta t_{start}$ this will result in the record from the given VPLMN 50V not being matched to the record from the HPLMN. In order to circumvent this problem the following may be applied:

Perform matching as described above but with a high $\Delta t_{start}$ and high $\Delta t_{dur}$. The time difference of START_TIME$_{HO}$–START_TIME$_{VO}$, and DUR$_{HO}$–DUR$_{VO}$ is stored.

For the stored values those for which the duration difference is below a given limit (|DUR$_{HO}$–DUR$_{VOH}$|<$\Delta t_{duration}$) are processed. For matching records for which the duration difference is below this limit the following should be calculated.

The mean value of the time differences of the matching records (average value of the start time differences) TIME_SHIFT$_{VPLMN}$.

The standard deviation of the time differences, DEV$_{VPLMN}$.

The matching criteria of call start times should be modified as follows: |START_TIME$_{HO}$–START_TIME$_{VOH}$–TIME_SHIFT$_{VPLMN}$|<$\Delta t_{start}$(DEV$_{VPLMN}$), where $\Delta t_{start}$(DEV$_{VPLMN}$) time limit is calculated from DEV$_{VPLMN}$.

As in process II, with the above described method VPLMN specific time shifts and VPLMN specific time limits are introduced that improve the accuracy and efficiency of the matching of start times, resulting in increased accuracy and efficiency in the whole record matching process. VPLMN dependent time shift and time limit parameters may be calculated on a given sample and used by the matching process, or may be recalculated for every new usage to be processed.

Finishing Process III the following results should be achieved.

List of MSISDNs (CALLING_PARTY$_{HO}$) the SIMs 68 of the SIM-boxes 64 (used on the HPLMN 50H) identified that used to terminate International calls from the VPLMN 50V to the HPLMN 50H or to other domestic networks. Call details from matching incoming Roaming Records and originating type of CDRs from which MSISDNs of SIM-boxes are determined should be used as a proof of SIM-box usage.

Statistical data collected for each VPLMN$_{VO}$ on calls originated by subscribers that terminated by a SIM-box used on the HPLMN network. This statistical data should also be used for trend analysis if the data is cumulated not only for VPLMN$_{VO}$, however for dates also.

Incoming roaming records for calls terminated by a SIM-box should be selected and the information—originally contained by the incoming roaming records—should be shared with the VPLMN from which network the problematic usage was originated without violating data protection laws since the VPLMN also has the same usage details. From the shared information the VPLMN should determine international carriers used to carrying calls in question and should use these information as a proof when negotiating with international carriers.

If the SIM-box is used on the HPLMN and the call is terminated to a subscriber of the HPLMN Process III selects the originating leg (from the SIM-box to the called party), and Process II selects the terminating leg for the same on-net call. If the SIM-box is used on the HPLMN and the call is terminated to a subscriber of another network only the originating leg (from the SIM-box to the called party) is selected in Process III. When the SIM-box is used on another domestic network only the terminating leg is selected by Process II.

Second Embodiment

Referring to FIG. 5, when mobile terminal 54 calls a subscriber mobile terminal 52H of the home mobile network (HPLMN 50H), the call is routed to the HPLMN 50H and this terminates the call to the called party 52H regardless of whether the called party is on the HPLMN 50H or roamed to a visited mobile network VPLMN 50V. The call arrives to the HPLMN of the called party regardless whether or not the call is originated from the HPLMN or from any other domestic or foreign network. If the called subscriber 52H is roamed to a visited network 50H the call is routed by the HPLMN 50H to the VPLMN 50V via international call route 25.

Usage generated by roamers is charged by VPLMN 50V to HPLMN 50H. Charging is based on TAP files sent by the VPLMN 50V to the HPLMN 50H containing usage details. In order to minimize roaming fraud VPLMN 50V also should send NRTRDE files to the HPLMN 50H. Since only the content of these incoming files and not of their formats is important in connection with the system described herein, records of TAP and NRTRDE files will again be referred as incoming Roaming Records.

When the call is connected to a subscriber mobile terminal 52H of the HPLMN 50H roamed to the VPLMN 50V, the HPLMN 50H generates a CDR for the roaming call and the VPLMN 50V also generates a terminating record that is sent to the HPLMN 50H in the incoming Roaming Records.

As discussed above, the following parameters are included in the incoming Roaming Records generated by the VPLMN 50V for calls terminated by the subscriber of the HPLMN 50H roamed to the visited network: the identifier of the VPLMN (VPLMN$_{VT}$), the IMSI of the called party (IMSI$_{VT}$), the number of the calling party (CALLING_PARTY$_{VT}$), the call start time in the local time of the VPLMN (START_TIME$_{VT}$), and the duration of the call (DUR$_{VT}$).

The RR will therefore include the following:

VPLMN$_{VT}$
IMSI$_{VT}$
CALLING_PARTY$_{VT}$
START_TIME$_{VT}$
DUR$_{VT}$

When the call from the HPLMN 50H is connected to the mobile terminal 52H roaming in the VPLMN 50V, a specific terminating type of Call Data Record (CDR) is generated on the HPLMN 50H for the roaming call leg.

The following parameters are included in this type of terminating CDR: the IMSI of the called party (IMSI$_{HR}$), the number of the calling party (CALLING_PARTY$_{HR}$), the call start time in the local time of the HPLMN (START_TIME$_{HR}$) and the duration of the call (DUR$_{HR}$).

This terminating CDR will therefore include the following:

CALLING_PARTY$_{HR}$
IMSI$_{HR}$
START_TIME$_{HR}$
DUR$_{HR}$

The RR and the CDR are used to make appropriate charges to the called and calling party in a known manner. The embodiment uses this information to detect the use of a "SIM BOX" used to terminate international calls to subscriber of the HPLMN roaming on the visited network.

Process I

For the incoming Roaming Records (RRs) of known type described above, the following steps should be applied;

Since the time stamps (START_TIME$_{VT}$) for the call start times contained by incoming Roaming Records are in the local time of the VPLMN these time stamps should be converted to the local time (e.g. by using the UTC offset contained by the incoming Roaming Records) of the HPLMN (START_TIME$_{VTH}$).

As a result of this process the following parameters should be selected from incoming Roaming Records for calls terminated by roamers on the VPLMN network:

VPLMN$_{VT}$, IMSI$_{VT}$, CALLING_PARTY$_{VT}$, START_TIME$_{VTH}$, START_TIME$_{VT}$, DUR$_{VT}$

Such a Roaming Record is shown at 80 in FIG. 5.

In order to increase the efficiency of the process described below resulting records should be collected separately based on the date part of the START_TIME$_{VTH}$, however the process should also be performed without this separation.

In accordance with a second embodiment of the system described herein, an attempt is made to match the RR 80 to the corresponding CDR, 82, for a particular call. Process II should be performed for all of the incoming Roaming Records selected above.

Process II

In order to select CDRs generated by the HPLMN 50H for roaming calls matching to Roaming Records selected by Process I the following steps are applied for all of this type of CDRs generated within the time window of the START_TIME$_{VTH}$ values. If any of the matching detailed below fails the process should be restarted with a new roaming CDR 82.

Take a roaming CDR 82 and search for the IMSI (IMSI$_{HR}$) in the list of IMSI$_{VT}$ in the RRs, including RR 80.

If IMSI$_{HR}$ matches the IMSI$_{VT}$, the call start time (START_TIME$_{HR}$) is compared to the START_TIME$_{VTH}$. Since system clocks of the HPLMN and the VPLMN may slightly differ, the START_TIME$_{HR}$ and the START_TIME$_{VTH}$ should be considered as matching time stamps if the absolute value of the time difference between these time stamps is less or equal to a predefined time limit |START_TIME$_{HR}$−START_TIME$_{VTH}$|≤Δt$_{start}$.

In the next step the call duration DUR$_{HR}$ of CDR 82 is compared to DUR$_{VT}$ of RR 80. DUR$_{HR}$ and DUR$_{VT}$ should be considered as matching durations if the absolute value of the difference between these duration is less or equal to a predefined time limit: |DUR$_{HR}$−DUR$_{VT}$|≤Δt$_{duration}$. Since the difference in system clocks has no effect on the call durations the Δt$_{duration}$ is typically much less than the Δt$_{start}$.

If the values match true (IMSI$_{HR}$ matches to IMSI$_{VTH}$ and |START_TIME$_{HR}$−START_TIME$_{VTH}$|≤Δt$_{start}$ and |DUR$_{HR}$−DUR$_{VT}$|≤Δt$_{duration}$, the terminating leg (terminated at the VPLMN 50V) and the leg routed from the HPLMN 50H of the same call is identified.

In case when system clocks of the different networks are not synchronized it can happen that the time difference of the system clocks of the HPLMN 50H and the VPLMNs vary from VPLMN to VPLMN. In order to improve the accuracy of matching it is desirable to minimize Δt$_{start}$. However, if the time difference of the system clocks of the HPLMN 50H and the given VPLMN 50V is higher than Δt$_{start}$ this will result in the record from the given VPLMN 50V not being matched to the record from the HPLMN. In order to circumvent this problem the following may be applied:

Perform matching as described above but with a high Δt$_{start}$ and high Δt$_{dur}$. The time difference of START_TIME$_{HR}$−START_TIME$_{VTH}$, and DUR$_{HR}$−DURB$_{VT}$ is stored.

For the stored values those for which the duration difference is below a given limit (|DUR$_{HR}$−DUR$_{VT}$|<Δt$_{duration}$) are processed. For matching records for which the duration difference is below this limit the following should be calculated.

The mean value of the time differences of the matching records (average value of the start time differences) TIME_SHIFT$_{VPLMN}$.

The standard deviation of the time differences, DEV$_{VPLMN}$.

The matching criteria of call start times should be modified as follows: |START_TIME$_{HR}$−START_TIME$_{VTH}$−TIME_SHIFT$_{VPLMN}$|<Δt$_{start}$(DEV$_{VPLMN}$), where Δt$_{start}$(DEV$_{VPLMN}$) time limit is calculated from DEV$_{VPLMN}$.

With the above described method VPLMN specific time shifts and VPLMN specific time limits are introduced that improve the accuracy and efficiency of the matching of start times, resulting in increased accuracy and efficiency in the whole record matching process. VPLMN dependent time shift and time limit parameters may be calculated on a given sample and used by the matching process, or may be recalculated for every new usage to be processed.

In case of the method described in the second embodiment, each RR should have a roaming CDR. However, even when using the method that improves the accuracy of the matching process it can happen that there remain unmatched RR and CDR records, e.g. because the actual time shift of the given VPLMN is higher than set when the time shift values were calculated (e.g. because wrong UTC offsets are set in the incoming roaming records). In such case unmatched RR and roaming CDR records should be checked and matched manually by human, and the VPLMN specific time shift (TIME_SHIFT$_{VPLMN}$) and VPLMN specific time limit Δt$_{start}$(DEV$_{VPLMN}$) should be set according to this manual process. VPLMN specific time shift (TIME_SHIFT$_{VPLMN}$) and VPLMN specific time limit Δt$_{start}$(DEV$_{VPLMN}$) values determined by the manual matching of unmatched RR and roaming CDR records should also be used in the process described in the first embodiment.

As shown in FIG. 5, the call may be mis-routed if the International carrier 25 diverts the call to a SIM BOX 84, typically via a VoIP connection 86, and the SIM BOX 84 then uses a SIM 88 registered with VPLMN 50V to call the terminal 52H and to route the call to the terminal 54.

For these matching CDRs and Roaming Records the trunk/circuit group in which the call is routed to the International Carrier 25 should be determined, so identifiers of international call carriers should be linked to the matching CDRs and Roaming Records.

For each matching CDR and Roaming Record, the matching of calling party phone numbers (CALLING_PARTY$_{HR}$ and CALLING_PARTY$_{VT}$) should be checked as follows:

- If the CALLING_PARTY$_{HR}$ and CALLING_PARTY$_{VT}$ are matching the call is determined to be routed in the normal way and the correct calling line identity (CLI) has been presented to the VPLMN 50V. The number of these cases should be counted for VPLMN$_{VT}$, for the visited country and for the identifier of international call carrier for statistical purposes.
- If CALLING_PARTY$_{HR}$ is different to the CALLING_PARTY$_{VT}$ but the CALLING_PARTY$_{VT}$ is not empty it is determined that the call is routed through a foreign SIM-box 84 used to terminate calls to the VPLMN 50V and CALLING_PARTY$_{VT}$ is identified as the phone number of the SIM 88 of the SIM-box 84. The number of these cases should be counted for VPLMN$_{VT}$, for the visited country and for the identifier of international call carrier for statistical purposes.
- If CALLING_PARTY$_{VT}$ is empty it may be determined that a SIM-box is not introduced in the international call path; however, it should be assumed that the call is deflected from the normal route to a poor quality path. The number of these cases should be counted for VPLMN$_{VT}$, for the visited country and for the identifier of international call carrier for statistical purposes.

Finishing Process II the following results should be achieved.

- List of MSISDNs of SIMs of foreign SIM-boxes identified used to terminate international calls from the HPLMN 50H to the VPLMN 50V. Call details from matching incoming Roaming Records and roaming CDRs from which MSISDNs of SIM-boxes are determined should be used as a proof of SIM-box usage.
- Statistical data collected for each VPLMN$_{VT}$, visited country, identifier of international call carriers on calls terminated by subscribers of the HPLMN should be as follows:
  - number of calls,
  - number of calls for which the correct CLI was presented,
  - number of calls for which the CLI was empty, and
  - number of calls terminated by SIM-boxes.

This statistical data may also be used for trend analysis.

With this method the HPLMN 50H determines whether the International Carrier 25 is routing the call correctly without any test calls generated for this purpose.

Incoming Roaming Records for problematic calls (no CLI presented or the call is terminated by a SIM-box) should be selected and this information—originally contained by the incoming roaming record—should be shared with the VPLMN 50V on which network the problematic usage was terminated without violating data protection laws since the VPLMN 50V also has the same usage details. From the shared information the VPLMN 50V should identify SIM-boxes terminating calls to the VPLMN 50V.

With the second embodiment the SIM boxes used to terminate calls to the visited networks (foreign SIM boxes used abroad) should be determined; moreover the quality of the international call paths 25 provided by international call carriers should also be measured.

Third Embodiment

As described above, when a caller calls the MSISDN of the mobile terminal 52H (FIG. 6) the call is always initially routed to HPLMN 50H of the mobile terminal 52H. In order to route the incoming call to the called party (e.g. from the mobile terminal 54), the HLR 21 is queried by the (G)MSC 29 of the HPLMN. The HLR 21 knows the address of the VLR 19B with which the roaming terminal 52H is registered. The HLR 21 contacts the VLR 19B for an MSRN that—as a result of the request received from HLR 21—is temporarily allocated to the called mobile terminal 52H by VLR 19B from a technical number range allocated to the VLR 19B by the VPLMN 50V. The temporarily allocated MSRN is sent back to the HLR 19 that gives the MSRN to the (G)MSC 23 to provide the requested routing information. By using the MSRN number the (G)MSC 23 routes the call to the foreign MSC to which the VLR 19B belongs and with which the mobile terminal 52H is registered in VPLMN 50V. The MSRN is transmitted between the GMSC 23 of the HPLMN 50H and the GMSC 23B of the VPLMN 50V. The visited MSC to which the VLR 19B belongs is then able to page the mobile terminal 52H and to allow the call between the caller mobile terminal 54 and the called mobile terminal 52H. At the end of the process the VLR 19B frees the temporally allocated MSRN 50 that it can be reused to connect other calls to called parties located under and served by the VLR 19B. MSRNs are transmitted between networks on international communication path 25 only in that case when a HPLMN routes the call to a VPLMN where the called subscriber of the HPLMN is roamed.

As also explained above, MSRN numbers allocated by a particular network (such as the MSRN allocated to the mobile terminal 52H by the VPLMN 50V in this example), are only ever dialled by an MSC (GMSC 23B in this example). MSRN's are allocated from predetermined number ranges matching to the numbering plan of the given operator. Most networks block calls dialled to MSRN's by mobile terminals 54 and other terminals, including SIM boxes. Only MSC's (such as GMSC 23B) are permitted to dial MSRN numbers.

However, as shown in FIG. 6, when International Carrier 25 diverts a call to from the GMSC 23 of the HPLMN 50 to a SIM-box 94, typically via a VoIP connection 96, the SIM-box 94 endeavours to contact the called mobile terminal 52H roamed under VLR 19B by dialling the MSRN received from HPLMN 50H. If the SIM 98 in the SIM-box 94 making the call to the mobile terminal 52H is a SIM issued by the VPLMN 50V, as indicated above, the call will be blocked as the dialled number is an MSRN number known to the VPLMN 50V. The call is therefore unsuccessful and is recorded as an Unsuccessful Call Attempt (UCA).

In the event that the VPLMN 50V is configured such that it does not block calls to the MSRN by mobile terminals, or if the SIM 98 in the SIM-box 94 that calls the MSRN is registered with a different network to the network that is allocated the MSRN, then the call may be routed successfully to the mobile terminal 52H. In this event, the HPLMN 50V generates a CDR containing information about the call originated to the MSRN number.

The above description relates to a situation when the mobile terminal 52H receives a call on a visited network.

In the event that the mobile terminal 52H is a CAMEL roaming terminal that originates a call, as shown in FIG. 7, a particular issue with the presence of SIM-box 104 arises when CAMEL roaming terminal 52H initiates (rather than terminates) a call whilst roaming on VPLMN 50V.

When mobile terminal 52H, which has as its home network HPLMN 50H but is roaming in VPLMN 50V as a CAMEL roaming terminal, originates a call by dialling the MSISDN of destined party, the VLR 19B of the VPLMN 50V with which the mobile terminal 52H is currently registered knows that the mobile terminal 52H is a CAMEL roaming terminal. The destined party could be mobile terminal 54 or any number (not just a mobile number). The VLR 19B is aware of the home network (HPLM 50H) of the mobile terminal 52H, and the visited MSC 23B to which the VLR 19B belongs sends a request to HPLMN 50H to issue a CAMEL roaming number to allow the call from mobile terminal 52H to be routed to the Intelligent Network Platform (IN) 56 of the HPLMN that charges and controls the call to be connected to the called party. HPLMN 50H issues a CAMEL roaming number temporarily and returns this to the VLR 19B of the VPLMN 50V. The visited MSC 23B to which the VLR 19B belongs dials the CAMEL roaming number (which is recognised by VPLMN 50V as the number of the HPLMN 50H) and the call is routed to HPLMN 50H. The call is routed to Intelligent Network Platform (IN) 56 in HPLMN 50H that is used to control and charge CAMEL calls. The IN 56 then connects the call to the called party.

If the call dialled by the MSC 23B using the CAMEL roaming number is not transmitted from VPLMN 50V to HPLMN 50H by the International Carrier 25, but is diverted to the SIM-box 104 on HPLMN 50H, e.g. via VoIP connection 106, the call may not be successfully connected. When the SIM-box 104 receives the CAMEL-roaming number, the SIM 108 therein dials the number. However, typically HPLMN 50H blocks calls from its network to CAMEL roaming numbers dialled by mobile terminals or other terminals using SIMs, such as SIM 108, belonging to the HPLMN 50H. The unsuccessful call may be recorded as an Unsuccessful Call Attempt (UCA).

In the event that the SIM 108 in the SIM-box 104 that dials the call using the CAMEL roaming number belongs to a different network than the network of the HPLMN 50H, the CAMEL roaming number may not be blocked. Even if the SIM 108 in the SIM-box 104 that dials the call is a SIM of the HPLMN 50H, the HPLMN 50H may be configured to allow the dialling of CAMEL roaming numbers. In this instance also, the call may be connected to the mobile terminal 54. If the call is successfully connected, the HPLMN 50H will generate a Call Details Record (CDR) containing information about the call originated to the CAMEL roaming number.

SIM-boxes 94,104 used to terminate international calls to technical ranges (MSRNs or CAMEL roaming numbers) may be detected as follows:

- If calling by subscribers from the HPLMN network to technical number ranges of the HPLMN is blocked the call is not connected, so callers to such technical ranges are detected as follows:
  - By querying the database of an appropriate traffic analysis tool 110 used to collect information on every call or call attempt Unsuccessful Call Attempts should be queried for which the originated call is originated from the HPLMN network and the call is blocked by the network.
  - In a network where CDRs for Unsuccessful Call Attempts (UCAs) are generated, UCA records for calls originated from the HPLMN network are queried for records in which the called numbers match technical number ranges detailed above.
  - From these records selected above MSISDNs that tried to originate calls to technical number ranges should be determined.
- If calling by subscribers from the HPLMN network to technical number ranges of the HPLMN is not blocked or the call is diverted to technical number ranges of other domestic operators the call is connected, so callers to such technical ranges are detected as follows:
  - By querying the database of an appropriate traffic analysis tool 110 used to collect information on every call or call attempt. The database should be queried for successful originating type (mobile or PBX originated records) records for which the originated call is connected, the call is originated from the HPLMN 50H and the call is diverted to a number of a known technical number range detailed above.
  - Originating type CDR records generated by the network (mobile or PBX originated records) should be queried for records in which the call is originated from the HPLMN 50H and the call is diverted to a number of a known technical number range detailed above.
  - From these records selected the MSISDNs used to originate calls to technical number ranges should be determined.

It should be noted that subscribers could call technical numbers by mistake and/or by misdialling a number. In the later case it is quite typical that they repeatedly redial the same number. In order to minimise the influence of this effect and to reduce the number of fake alarms:

- The number of different technical numbers called/attempted to call by the MSISDN selected in a given time period should be counted.
- An appropriate limit should be set: when the number of counted different technical numbers called in a given time period is above the limit (e.g. the given MSISDN frequently calls different technical numbers) the given MSISDN should be considered as that of a SIM of a SIM-box, while if this figure is below the limit (e.g. the given MSISDN redials same technical numbers) it should be considered as a false alarm.

Statistical data for identified SIM-boxes (e.g. number of calls to given technical number ranges, number of different technical numbers called) should be collected. Statistical data should also be used for trend analysis if the data is cumulated for dates also.

Finishing the process described the following results should be achieved.

- List of MSISDNs of SIM-boxes identified that are used to terminate international calls to the technical ranges.
- Number of international calls blocked because the call was tried to connect to a technical number by a SIM-box.
- Statistical data on international calls to technical number ranges connected/blocked.

In each of the figures, the operator that can identify SIM boxes with the methods described are on the left hand side except in FIG. 6. in which the operator is on the right hand side. In all of the other cases the operator that can identify SIM boxes with these methods is the HPLMN. However, in the case depicted in FIG. 6, the VPLMN identifies SIM boxes (since the call is originated to visitor from the HPLMN of the inbound roamer).

Various embodiments of the system described herein are now defined in the following paragraphs.

i. A mobile telecommunications system in which a subscriber has a home network and is able to roam in a visited network, in which a roaming record is generated when the subscriber makes or receives a call in the visited network and in which call detail records are generated when a call is terminated or originated by the home network, the system including an analyzer for analysing the roaming records and the call detail records to identify mis-routed telephone calls.

ii. The system of paragraph i, including a determining device for determining the telephone number of a calling party and adding this to the roaming record.

iii. The system of paragraph i, including a converter for converting time information in the roaming record into the local time of the home network.

iv. The system of paragraph i, ii or iii, wherein the roaming record includes a roaming record identifier of a called party.

v. The system of any one of paragraphs i to iv, wherein the call detail record is the call detail record of a call terminated by the home network and includes a call detail record identifier of the called party.

vi. The system of paragraph iv and v, wherein the analyzer is operable to compare the roaming record identifier to the call detail record identifier to determine if the respective identifiers correspond.

vii. The system of paragraph vi, wherein if the respective identifiers correspond, the analyzer is operable to determine whether call time information in the roaming record corresponds to call time information in the call detail record.

viii. The system of paragraph vii, wherein the call time information of the roaming record and/or the call detail record comprises the start time of the call.

ix. The system of paragraphs vii or viii, wherein the call time information of the roaming record and/or the call detail record comprises the duration of the call.

x. The system of any one of paragraphs i to ix, wherein if the roaming record identifier and the call detail record identifier correspond and the call time information corresponds, the analyzer is operable to determine whether a call detail record identifier of the calling party corresponds to a roaming record identifier of the calling party to determine whether the telephone call is mis-routed.

xi. The system of any one of paragraphs i to iv, wherein the call detail record is the call detail record of a call originated by the home network and includes an identifier of the called party.

xii. The system of paragraph xi, wherein the analyzer is operable to compare the roaming record identifier of the called party to the call detail record identifier of the called party to determine if they correspond.

xiii. The system of paragraph xii, wherein if the respective identifiers correspond, the analyzer is operable to determine whether call time information in the roaming record corresponds to call time information in the call detail record.

xiv. The system of paragraph xiii, wherein the call time information of the roaming record and/or the call detail record comprises the start time of the call.

xv. The system of paragraph xii or xiii, wherein the call time information of the roaming record and/or the call detail record comprises the duration of the call.

xvi. The system of any one of paragraphs x to xv, wherein if the roaming record identifier and the call detail record identifier correspond and the call time information corresponds the analyzer is operable to identify call detail records and roaming records for which the respective called party identifiers correspond and the respective time data correspond in order to identify mis-routed calls.

xvii. A mobile telecommunications system in which a subscriber has a home network and is able to roam in a visited network and in which a temporary technical telephone number is allocated to the subscriber when roaming to facilitate routing of telephone calls, which temporary technical telephone number is not publicly known, the system including an analyzer for analysing telephone call records to identify telephone calls or attempted telephone calls to the temporary technical telephone number for identifying mis-routed calls.

xviii. The system of paragraph xvii, wherein the temporary technical telephone number is a Mobile Station Roaming Number, MSRN.

xix. The system of paragraph xvii, wherein the temporary technical telephone number is a CAMEL roaming number.

xx. The system of paragraph xvii, xviii or xix, wherein the analyzer is operable to analyse records of unsuccessful call attempts.

xxi. The system of any one of paragraphs xvii to xx, wherein the analyzer is operable to analyse Call Detail Records, CDRs.

xxii. The system of any one of paragraphs xvii to xxi, wherein the analyzer is operable to identify the telephone number of a device that originated the telephone call or attempted telephone call to the temporary technical telephone number.

xxiii. A method of identifying mis-routed telephone calls in a mobile telecommunications system in which a subscriber has a home network and is able to roam in a visited network, in which a roaming record is generated when the subscriber makes or receives a call in the visited network and in which call detail records are generated when a call is terminated or originated by the home network, the method including analysing the roaming records and the call detail records to identify mis-routed telephone calls.

xxiv. The method of paragraph xxiii, including determining the telephone number of a calling party and adding this to the roaming record.

xxv. The method of paragraph xxiii, including converting time information in the roaming record into the local time of the home network.

xxvi. The method of paragraph xxiii, xxiv or xxv, wherein the roaming record includes a roaming record identifier of a called party.

xxvii. The method of any one of paragraphs xxi to xvi, wherein the call detail record is the call detail record of a call terminated by the home network and includes a call detail record identifier of the called party.

xxviii. The method of paragraph iv and v, wherein the analysing step compares the roaming record identifier to the call detail record identifier to determine if the respective identifiers correspond.

xxix. The method of paragraph xxviii, wherein if the respective identifiers correspond, the analysing step determines whether call time information in the roaming record corresponds to call time information in the call detail record.

xxx. The method of paragraph xxix, wherein the call time information of the roaming record and/or the call detail record comprises the start time of the call.

xxxi. The method of paragraphs xxix or xxx, wherein the call time information of the roaming record and/or the call detail record comprises the duration of the call.

xxxii. The method of any one of paragraphs xxiii to xxxi, wherein if the roaming record identifier and the call detail record identifier correspond and the call time information corresponds, the analysing step determines whether a call detail record identifier of the calling party corresponds to a roaming record identifier of the calling party to determine whether the telephone call is mis-routed.

xxxiii. The method of any one of paragraphs xxiii to xxvi, wherein the call detail record is the call detail record of a call originated by the home network and includes an identifier of the called party.

xxxiv. The method of paragraph xxxiii, wherein the analysing step compares the roaming record identifier of the called party to the call detail record identifier of the called party to determine if they correspond.

xxxv. The method of paragraph xxxiv, wherein if the respective identifiers correspond, the analysing step determines whether call time information in the roaming record corresponds to call time information in the call detail record.

xxxvi. The method of paragraph xxxv, wherein the call time information of the roaming record and/or the call detail record comprises the start time of the call.

xxxvii. The method of paragraph xxxv or xxxvi, wherein the call time information of the roaming record and/or the call detail record comprises the duration of the call.

xxxviii. The method of any one of paragraphs xxxii to xxxvii, wherein if the roaming record identifier and the call detail record identifier correspond and the call time information corresponds the analysing step identifies call detail records and roaming records for which the respective called party identifiers correspond and the respective time data correspond in order to identify mis-routed calls.

xxxix. A method of identifying mis-routed calls in a mobile telecommunications system in which a subscriber has a home network and is able to roam in a visited network and in which a temporary technical telephone number is allocated to the subscriber when roaming to facilitate routing of telephone calls, which temporary technical telephone number is not publicly known, the method including analysing telephone call records to identify telephone calls or attempted telephone calls to the temporary technical telephone number for identifying mis-routed calls.

xL. The method of paragraph xxxix, wherein the temporary technical telephone number is a Mobile Station Roaming Number, MSRN.

xLi. The method of paragraph xxxix, wherein the temporary technical telephone number is a CAMEL roaming number.

xLii. The method of paragraph xxxix, xL or xLi, wherein the analysing step analyses records of unsuccessful call attempts.

xLiii. The method of any one of paragraphs xxxix to xLii, wherein the analysing step analyses Call Detail Records, CDRs.

xLiv. The method of any one of paragraphs xxxix to xLiii, wherein the analysing step identifies the telephone number of a device that originated the telephone call or attempted telephone call to the temporary technical telephone number.

xLv. A mobile telecommunications system substantially as hereinbefore described with reference to and/or substantially as illustrated in any one of or any combination of FIGS. 3 to 7 of the accompanying drawings.

xLvi. A method of identifying mis-routed calls in a mobile telecommunications system, substantially as hereinbefore described with reference to and/or substantially as illustrated in any one of or any combination of FIGS. 3 to 7 of the accompanying drawings.

Various of the embodiments discussed herein may be combined with each other in appropriate combinations in connection with the system described herein. Further, the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A mobile telecommunications system in which a subscriber has a home network and is able to roam in a visited network, in which a roaming record is generated when the subscriber makes or receives a call in the visited network and in which a call detail record is generated when a call is terminated or originated by the home network, the system comprising:
   an analyzer configured to query a database of the analyzer and analyze the roaming record and the call detail record contained therein to identify a mis-routed telephone call, wherein the call detail record includes a call detail record identifier of at least one of: a calling party or a called party, wherein the roaming record includes a roaming record identifier of at least one of: the calling party or the called party, and wherein the analyzer is operable to compare the roaming record identifier to the call detail record identifier of a given telephone call to determine correspondence of the respective identifiers according to:
   (i) where the given telephone call originates in the home network, comparing the called party identifier of the roaming record to the called party identifier of the call detail record, to determine correspondence of the identifiers;
   (ii) where the given telephone call terminates in the home network comparing the calling party identifier of the roaming record to the calling party identifier of the call detail record, to determine correspondence of the identifiers; and
   (iii) where the roaming record and the call detail record both indicate that the called party was called twice during a same time from the visited network and from the home network, to determine correspondence of the records,
   and wherein the analyzer determines that the given telephone call is mis-routed where the identifiers do not correspond or where the corresponding identifiers indicate multiple calls to the called party at the same time.

2. The system of claim 1, wherein the call detail record is a call detail record of a call terminated by the home network.

3. The system of claim 1, wherein, the call detail record further includes call detail record time information and wherein the roaming record further includes roaming record time information, wherein, if the respective identifiers correspond, the analyzer is further operable to determine whether the roaming record time information corresponds to the call detail record time information.

4. The system of claim 3, wherein if the roaming record time information does not correspond to the call detail record time information, the analyzer is operable to determine that the given telephone call is mis-routed.

5. The system of claim 3, wherein the roaming record time information and the call detail record time information each includes at least one of: a start time of the given telephone call or a duration of the given telephone call.

6. The system of claim 3, further comprising:
a time converter component that converts the roaming record time information into a local time of the home network.

7. A mobile telecommunications system in which a subscriber has a home network and is able to roam in a visited network and in which a temporary technical telephone number is allocated to the subscriber when roaming to facilitate routing of telephone calls, which temporary technical telephone number is not publicly known, the system comprising:
an analyzer configured to query a database of the analyzer and analyze telephone call records contained therein to identify telephone calls or attempted telephone calls to the temporary technical telephone number for identifying mis-routed calls, wherein the telephone call records include a call detail record and a roaming record, wherein the call detail record includes a call detail record identifier of at least one of: a calling party or a called party, wherein the roaming record includes a roaming record identifier of at least one of: the calling party or the called party, and wherein the analyzer is operable to compare the roaming record identifier to the call detail record identifier of a given telephone call to determine correspondence of the respective identifiers according to:
  (i) where the given telephone call originates in the home network, comparing the called party identifier of the roaming record to the called party identifier of the call detail record, to determine correspondence of the identifiers;
  (ii) where the given telephone call terminates in the home network comparing the calling party identifier of the roaming record to the calling party identifier of the call detail record, to determine correspondence of the identifiers; and
  (iii) where the roaming record and the call detail record both indicate that the called party was called twice during a same time from the visited network and from the home network, to determine correspondence of the identifiers,
and wherein the analyzer determines that the given telephone call is mis-routed where the identifiers do not correspond or where the corresponding identifiers indicate multiple calls to the called party at the same time.

8. The system of claim 7, wherein the analyzer is operable to identify the telephone number of a device that originated the telephone call or attempted telephone call to the temporary technical telephone number.

9. A method of identifying mis-routed telephone calls in a mobile telecommunications system in which a subscriber has a home network and is able to roam in a visited network, in which a roaming record is generated when the subscriber makes or receives a call in the visited network and in which a call detail record is generated when a call is terminated or originated by the home network, the method comprising:
querying, using an analyzer, a database of the analyzer;
analyzing, using the analyzer, the roaming record and the call detail record contained within the database to identify a mis-routed telephone call, wherein the call detail record includes a call detail record identifier of at least one of: a calling party or a called party, wherein the roaming record includes a roaming record identifier of at least one of: the calling party or the called party, and wherein the analyzing includes comparing the roaming record identifier to the call detail record identifier of a given telephone call to determine correspondence of the respective identifiers according to:
  (i) where the telephone call originates in the home network, comparing the called party identifier of the roaming record to the called party identifier of the call detail record, to determine correspondence of the identifiers;
  (ii) where the telephone call terminates in the home network comparing the calling party identifier of the roaming record to the calling party identifier of the call detail record, to determine correspondence of the identifiers; and
  (iii) where the roaming record and the call detail record both indicate that the called party was called twice during a same time from the visited network and from the home network, to determine correspondence of the identifiers,
and wherein the analyzing determines that the given telephone call is mis-routed where the identifiers do not correspond or where the corresponding identifiers indicate multiple calls to the called party at the same time.

10. The method of claim 9, wherein the call detail record is the call detail record of a call terminated by the home network.

11. The method of claim 9, wherein, the call detail record further includes call detail record time information and wherein the roaming record further includes roaming record time information, and wherein, if the respective identifiers correspond, the analyzing step further determines whether the roaming record time information corresponds to the call detail record time information.

12. The method of claim 11, wherein, if the roaming record time information does not correspond to the call detail record time information, the analyzing step determines that the given telephone call is mis-routed.

13. The method of claim 9, wherein the roaming record time information and the call detail record time information each includes at least one of: a start time of the given telephone call or a duration of the given telephone call.

14. The method of claim 9, further comprising:
converting the roaming record time information into a local time of the home network.

15. A method of identifying mis-routed calls in a mobile telecommunications system in which a subscriber has a home network and is able to roam in a visited network and in which a temporary technical telephone number is allocated to the subscriber when roaming to facilitate routing of telephone calls, which temporary technical telephone number is not publicly known, the method comprising:
querying, using an analyzer, a database of the analyzer;
analyzing, using the analyzer, telephone call records contained within the database to identify telephone calls or attempted telephone calls to the temporary technical telephone number for identifying mis-routed calls, wherein the telephone call records include a call detail record and a roaming record, wherein the call detail record includes a call detail record identifier of at least one of: a calling party or a called party, wherein the roaming record includes a roaming record identifier of at least one of: the calling party or the called party, and wherein the analyzer is operable of at least one of: the calling party or the called party, and wherein the analyzing includes comparing the roaming record identifier to the call detail record identifier of a given telephone call to determine correspondence of the respective identifiers according to:
  (i) where the given telephone call originates in the home network, comparing the called party identifier of the roaming record to the called party identifier of the call detail record, to determine correspondence of the identifiers;

(ii) where the given telephone call terminates in the home network comparing the calling party identifier of the roaming record to the calling party identifier of the call detail record, to determine correspondence of the identifiers; and (iii) where the roaming record and the call detail record both indicate that the called party was called twice during a same time from the visited network and from the home network, to determine correspondence of the identifiers, and wherein the analyzing determines that the given telephone call is mis-routed where the identifiers do not correspond or where the corresponding identifiers indicate multiple calls to the called party at the same time.

16. The method of claim 15, wherein the analyzing step identifies the telephone number of a device that originated the telephone call or attempted telephone call to the temporary technical telephone number.

17. A mobile telecommunications system in which a subscriber has a home network and is able to roam in a visited network, in which a roaming record is generated when the subscriber makes or receives a call in the visited network and in which a call detail record is generated when a call is terminated or originated by the home network, the system comprising:

an analyzer configured to query a database of the analyzer and analyze the roaming record and the call detail record contained therein to identify a mis-routed telephone call, wherein the call detail record includes a call detail record identifier of at least one of: a calling party or a called party, and includes call detail record time information, wherein the roaming record includes a roaming record identifier of at least one of: the calling party or the called party, and includes roaming record time information, and wherein, for a given telephone call, the analyzer is operable to compare the roaming record identifier to the call detail record identifier to determine correspondence of the respective identifiers and is operable to compare the call detail record time information and the roaming record time information to determine correspondence of the call detail record time information and the roaming record time information and is operable to identify whether both the roaming record and the call detail record both indicate that the called part was called twice during a same time from the visited network and from the home network to determine correspondence of the respective records, wherein, when the call analyzer determines that the respective identifiers do not correspond or determines that the call detail record time information does not correspond to the roaming record time information or where the corresponding identifiers indicate multiple calls to the called party at the same time, the given telephone call is identified as being mis-routed.

18. The system of claim 17, wherein the roaming record time information and the call detail record time information each includes at least one of: a start time of the given telephone call or a duration of the given telephone call.

19. The system of claim 17, further comprising:

a time converter component that converts the roaming record time information into a local time of the home network.

* * * * *